United States Patent
Starck et al.

(10) Patent No.: US 9,884,512 B2
(45) Date of Patent: Feb. 6, 2018

(54) AXLE MEANS, METHOD FOR PRODUCING THE SAME AND MOTOR VEHICLE

(71) Applicant: GM GLOBAL TECHNOLOGY OPERATIONS LLC, Detroit, MI (US)

(72) Inventors: Richard Starck, Falkenstein (DE); Jürgen Siebeneick, Oberwesel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 14/792,014

(22) Filed: Jul. 6, 2015

(65) Prior Publication Data
US 2016/0031260 A1   Feb. 4, 2016

(30) Foreign Application Priority Data

Jul. 5, 2014   (DE) .......................... 10 2014 009999

(51) Int. Cl.
| F16C 13/00 | (2006.01) |
| B60B 27/00 | (2006.01) |
| B60B 35/18 | (2006.01) |
| F16C 35/067 | (2006.01) |

(Continued)

(52) U.S. Cl.
CPC ........ *B60B 27/0005* (2013.01); *B60B 27/001* (2013.01); *B60B 27/0078* (2013.01); *B60B 27/0089* (2013.01); *B60B 35/18* (2013.01); *F16C 35/067* (2013.01); *B60B 27/00* (2013.01); *B60B 2310/316* (2013.01); *B60B 2320/10* (2013.01); *B60B 2380/12* (2013.01); *B60B 2380/14* (2013.01); *B60B 2380/16* (2013.01); *B60B 2900/112* (2013.01);

(Continued)

(58) Field of Classification Search
CPC ...... F16C 19/18; F16C 19/184; F16C 19/505; F16C 19/54; F16C 35/04; F16C 35/045; F16C 35/061; F16C 35/06707; F16C 35/073; F16C 43/04; F16C 2326/02
See application file for complete search history.

(56) References Cited

U.S. PATENT DOCUMENTS

| 5,226,737 A * | 7/1993 | Sandy, Jr. | .......... B60B 27/0005 384/512 |
| 6,880,841 B2 | 4/2005 | Wang et al. | |
| 8,777,329 B2 | 7/2014 | Werries et al. | |

FOREIGN PATENT DOCUMENTS

| DE | 102009033224 A1 | 1/2011 |
| DE | 102013012482 A1 | 1/2015 |

(Continued)

OTHER PUBLICATIONS

German Patent Office, German Search Report for German Application No. 102014009999.7, dated Mar. 25, 2015.

*Primary Examiner* — Phillip A Johnson
(74) *Attorney, Agent, or Firm* — Lorenz & Kopf LLP

(57) ABSTRACT

An axle device for a motor vehicle includes an axle shaft, a wheel receiving unit fixed on an end of the axle shaft, and a support body on which the wheel receiving unit is supported from rotation fixed about an axis of rotation. A bearing unit is arranged between the support body and the wheel receiving unit. The bearing unit includes an inner bearing shell at least partially formed by a surface portion of the wheel receiving unit, an outer bearing shell at least partially formed by a sleeve body abutting the support body, and a bearing assembly arranged between the inner bearing shell and the outer bearing shell.

20 Claims, 2 Drawing Sheets

(51) Int. Cl.
*F16C 19/18* (2006.01)
*F16C 19/56* (2006.01)

(52) U.S. Cl.
CPC ....... *B60B 2900/113* (2013.01); *F16C 19/184* (2013.01); *F16C 19/56* (2013.01); *F16C 2326/02* (2013.01)

(56) References Cited

FOREIGN PATENT DOCUMENTS

FR           2853371 A1 * 10/2004 ............ F16C 19/184
JP           3706845 B2 * 10/2005 ............ F16C 35/067

* cited by examiner

AXLE MEANS, METHOD FOR PRODUCING THE SAME AND MOTOR VEHICLE

CROSS-REFERENCE TO RELATED APPLICATION

This application claims priority to German Patent Application No. 102014009999.7 filed Jul. 5, 2014, which is incorporated herein by reference in its entirety.

TECHNICAL HELD

This invention relates to an axle device for a motor vehicle, a method for producing such an axle device and a motor vehicle with such an axle device and/or with such a method.

BACKGROUND

Known axle devices for motor vehicle comprise a wheel receiving unit, on which a shaft or axle and a wheel unit can be fixed, and a support body, on which the wheel receiving unit can be rotatably fixed and through which the wheel receiving unit can be fixed to a body structure. In order to be able to ensure rotation of the wheel receiving unit relative to the support body a bearing unit is arranged between the support body and the wheel receiving unit, which comprises an inner bearing shell designed as a separate component, which is pressed onto the wheel receiving unit and which comprises an outer bearing shell designed as a separate component, which is formed on the support body.

With the known axle device, the individual components are formed from parts that are separate or can be separated from one another, which are joined together by means of screwing/pressing or extruding operations.

Because of the numerous fitting and joining surfaces, the individual parts have to be produced with very low manufacturing tolerances which increases the costs and renders the joining of the individual components difficult and time-intensive.

In order to counteract this problem, an axle device was proposed with the German Patent Application DE 10 2013 012 482.4, with which the inner hearing shell of the bearing unit is formed by a surface portion of the wheel receiving unit and with which the outer bearing shell is formed by a surface portion of the support body, as a result of which it was possible to reduce the manufacturing tolerances and the axle device has less friction and high durability. In order to form the bearing unit by the wheel receiving unit and the support body, rolling bearing steel is utilized here, as a result of which the weight of the axle device is increased.

SUMMARY

An object of an embodiment of the invention is to propose an axle device, with which the tolerances that occur, in particular the axial play, can be kept low and with which the weight can be reduced.

This object is solved through an axle device for a motor vehicle with at least one wheel receiving unit, on which at least one means of rotation, such as a shaft or an axle, and/or at least one wheel unit can be fixed or is fixed, with at least one support body, on which the wheel receiving unit can be or is rotatably fixed about an axis of rotation and with at least one bearing unit arranged between the support body and the wheel receiving unit, which comprises at least one inner bearing shell, which is formed at least in sections by a surface portion of the wheel receiving unit designed as outer bearing ring, the at least one outer bearing shell, which at least in sections is formed by a sleeve body abutting the support body and fixed by a fixing means, and which comprises a plurality of rolling bodies arranged between the inner bearing shell and the outer bearing shell.

The support body can comprise a steering knuckle of the motor vehicle. In addition, the support body can be fixed to a chassis component, for example a spring strut or an axle link. The means of rotation can comprise a driven or a non-driven vehicle axle.

Because of the fact that the inner bearing shell of the bearing unit is formed by a surface portion of the wheel receiving unit designed as outer bearing ring, the axle device can be produced with reduced components. Because of the fact that the outer bearing shell is formed by a sleeve body, the material of the support body can be freely selected. Because of this it is made possible that with the sleeve body rolling bearing steel is utilized, whereas the support body can be produced from a light metal, for example aluminum. In such a case, the weight of the axle device can be reduced, wherein at the same time through the component reduction smaller overall tolerances, in particular smaller axial play is ensured.

With axle devices, with which the bearing unit is entirely pressed into the support body, the tolerance field of the preload is increased because of the different compressions. Through the proposed axle device, an increase of the preload is reduced in such a manner that the same through minor effort is within a specific tolerance field.

The fixing means which fixes the sleeve body on the support body can basically be formed in any way. For example, the fixing means can comprise gluing, welding, soldering. The bearing play can be cost-effectively established when the fixing means fixing the sleeve body forming the outer bearing shell comprises crimping, forging and/or casting and/or when the support body comprises at least one stop element, which at least on one side limits axial movement of the sleeve body.

In order to produce the axle device with reduced components, it proves to be advantageous when the wheel receiving unit comprises a wheel receiving portion, on which the wheel unit can be fixed or is fixed, a hub portion, on the surface section of which the outer bearing ring is formed, and a rotary head, on which the means of rotation can be fixed or is fixed.

Because of the fact that the wheel receiving unit comprises the rotary head, the hub portion and wheel receiving portion, the axle device can be formed with reduced components and in a compact manner. In addition to this, joining of the individual components is thereby facilitated, as a result of which the assembly effort is shortened and the overall tolerances of the axle device can be reduced.

In principle, the bearing unit can comprise any bearing provided rotation of the wheel receiving unit about the axis of rotation is thereby made possible. With an embodiment of the axle device it is provided that the rolling bodies of a row, with respect to the rolling bodies of a further row, have a diameter that is the same or different from one another and/or when the rolling bodies comprise balls, cylinders, needles, spherical rollers or cones. N-row is to mean a bearing with N-rows. N can be a number between 1 and infinity.

When the axle device comprises a non-driven vehicle axle, the bearing unit can for example comprise a double-row bearing, with which the two rows with respect to the axis of rotation have the same distance, the same diameter.

In addition it is provided with an embodiment of the axle device that the rolling bodies of a row with respect to the rolling bodies of a further row have a diameter that is the same or deviating from one another and/or that the rolling bodies comprise balls, cylinders, needles, spherical rollers or cones.

When the axle devices are provided with a driven vehicle axle it proves to be advantageous when the bearing unit comprises a double-row bearing, in which the diameter of the two rows deviate from one another. In such a case, the row of the axis of rotation facing the means of rotation has a smaller distance, i.e. a smaller diameter than the row facing the wheel unit. In addition to this, the diameter of the rolling bodies of the row facing the wheel unit has a larger diameter than the rolling bodies of the row facing the means of rotation.

The support body can be formed from a light metal, whereas the sleeve body comprises a material that is suitable for bearings, in particular rolling bearings. Here it proves to be advantageous when the support body is formed at least partially from aluminum and/or when the sleeve body designed as outer bearing shell comprises rolling bearing steel.

In order to limit movement of the sleeve body in the direction towards the wheel unit, the support body comprises at least one stop element. This can be formed by a pocket in the support body or by a crimping of the support body created by over-forging.

In order to limit movement of the sleeve body in the direction towards the means of rotation it proves to be advantageous when the axle device comprises at least one locking element that can be fixed on the support body, with which the sleeve body can be fixed against movement in axial direction.

The locking element can comprise a locking ring which on the side of the bearing unit facing the means of rotation abuts the bearing unit, in particular the sleeve body. The locking element designed as locking ring can comprise a separate component or crimping of the support body created by over-forging.

Furthermore, the locking element can comprise a protrusion of the support body which can engage or engages into an in particular radially extending groove of the sleeve body. In order to join the groove of the sleeve body and the protrusion of the support body, a casting-in and/or forging-in process can be employed. In such a case, the axle device can be formed with reduced components.

In order to facilitate filling the bearing unit with rolling bodies and in order to fix the rolling bodies in the bearing unit, it can be provided with an embodiment of the axle device that the axle device comprises at least one closure element which continues axially on the surface portion of the wheel receiving unit forming the inner bearing shell of the bearing unit and axially forms a back-engagement for at least one row of rolling bodies.

In order to fix the closure element in turn against movement, the closure element can be welded or crimped for example to the wheel receiving unit in a fixed manner.

The tolerances of the axle device can be kept low when the axle device comprises a forming portion of the wheel receiving unit, in particular of the rotary head of the receiving unit, which abutting the closure element on the side facing away from the inner bearing shell, axially engaging behind the same.

In addition to this, the object is solved by a method for producing an axle device with at least one of the characterizing features mentioned before, of a motor vehicle with the steps: fixing at least one sleeve body forming an outer bearing shell for a bearing unit in a support body; measuring, in particular axially and radially a first bearing position and/or a second bearing position of an inner bearing shell formed by a surface portion of a wheel receiving unit, of the outer bearing shell and/or of a plurality of rolling bodies; if appropriate, pressing a first shaft sealing ring onto the wheel receiving unit; if appropriate, encasing a plurality of rolling bodies corresponding to the bearing shells measured in the first bearing position in a first bearing cage and/or arranging the first bearing cage equipped with a plurality of rolling bodies in the first bearing position of the wheel receiving unit; transferring the wheel receiving unit into the sleeve body; if appropriate, encasing a plurality of rolling bodies measured in the second bearing position corresponding to the measured bearing shells in a second bearing cage and/or arranging the second bearing cage equipped with a plurality of rolling bodies in the second bearing position of the wheel receiving unit; if appropriate, pressing a second shaft sealing ring onto the wheel receiving unit; if appropriate, fixing the sleeve body on the support body and/or fixing the closure element on the wheel receiving unit.

The sleeve body can be fixed in the support body by pressing-in, casting-in and/or forging-in. The sequence of the individual method steps is not compulsory but interchangeable if technically practical.

In a further development of the method it proves to be advantageous when the fixing of the sleeve body designed as outer bearing shell for the bearing unit in the support body comprises a pressing process, in particular pressing-in, and/or a casting process, in particular casting-in or over-casting.

Because of the fact that fixing the sleeve body designed as outer bearing shell for the bearing unit in the support body can be realized by pressing-in or by casting-in, preassembling of the system of support body and sleeve body is possible even at the supplier. In such a case, the sleeve body can be cast in as part of the casting process of the support body at the relevant supplier or is pressed into the support body at the wheel bearing manufacturer, who in such a case is provided with the support body and presses the bearing unit, in particular the sleeve body, into the support body. Because of this, the axial play of the axial device can be kept low compared with a bearing unit that is preassembled and subsequently pressed in its entirety.

In addition to this it proves to be advantageous when the fixing of the sleeve body comprises arranging at least one locking ring that can be fixed on the support body, which on the side of the bearing unit facing the means of rotation on the bearing unit, in particular on the sleeve body.

Furthermore, it proves to be advantageous when the fixing of the closure element comprises expanding or forming of a forming portion of the wheel receiving unit, in particular of the rotary head of the wheel receiving unit, which abutting the closure element on the side facing away from the inner bearing shell, axially engages behind the same.

As a further development of the last-mentioned method step it has proved to be practical when the expanding or forming comprises cold extruding.

Finally, the object is solved by a motor vehicle with at least one axle device, having at least one of the previously mentioned characterizing features, for a motor vehicle, which comprises a wheel receiving unit, on which at least one means of rotation, such as a shaft or an axle, and/or at least one wheel unit can be fixed or is fixed, which comprises at least one support body, on which the wheel receiving unit can be rotatably fixed or is rotatably fixed about an axis of rotation and which comprises at least one bearing unit arranged between the support body and the wheel receiving unit, which comprises at least one inner bearing shell, which is formed at least in sections by a surface portion of the wheel receiving unit designed as outer bearing ring, which comprises at least one outer bearing shell, which is formed at least in sections by a sleeve body abutting the support body and which is fixed by a fixing means, and which comprises a plurality of rolling bodies arranged between the inner bearing shell and the outer bearing shell.

The axle device, the method for producing such an axle device and a motor vehicle having such an axle device and/or with such a method prove to be advantageous in multiple respects.

Because of the fact that the inner bearing shell of the hearing unit is formed by a surface portion of the wheel receiving unit, the hearing unit can be produced with reduced components. Because of this, the overall tolerances of the axle device, in particular the axial play, can be reduced and the preload adjusted more precisely.

Because of the fact that the outer hearing shell is formed by the sleeve body, exclusively the sleeve body has to be formed from bearing steel, in particular rolling hearing steel. In the case of the support body, by contrast, light metal, in particular aluminum, can be utilized, as a result of which the total weight of the axle device can be kept low. Because of this, the advantage of a low bearing play with simultaneously low weight is realized.

BRIEF DESCRIPTION OF THE DRAWINGS

Further features, details and advantages can be taken from the attached patent claims, from the drawing representations and the following description of a preferred exemplary embodiment of the axle device.

DETAILED DESCRIPTION

The following detailed description is merely exemplary in nature and is not intended to limit the invention or the application and uses of the invention. Furthermore, there is no intention to be hound by any theory presented in the preceding background of the invention or the following detailed description.

Figure 1:
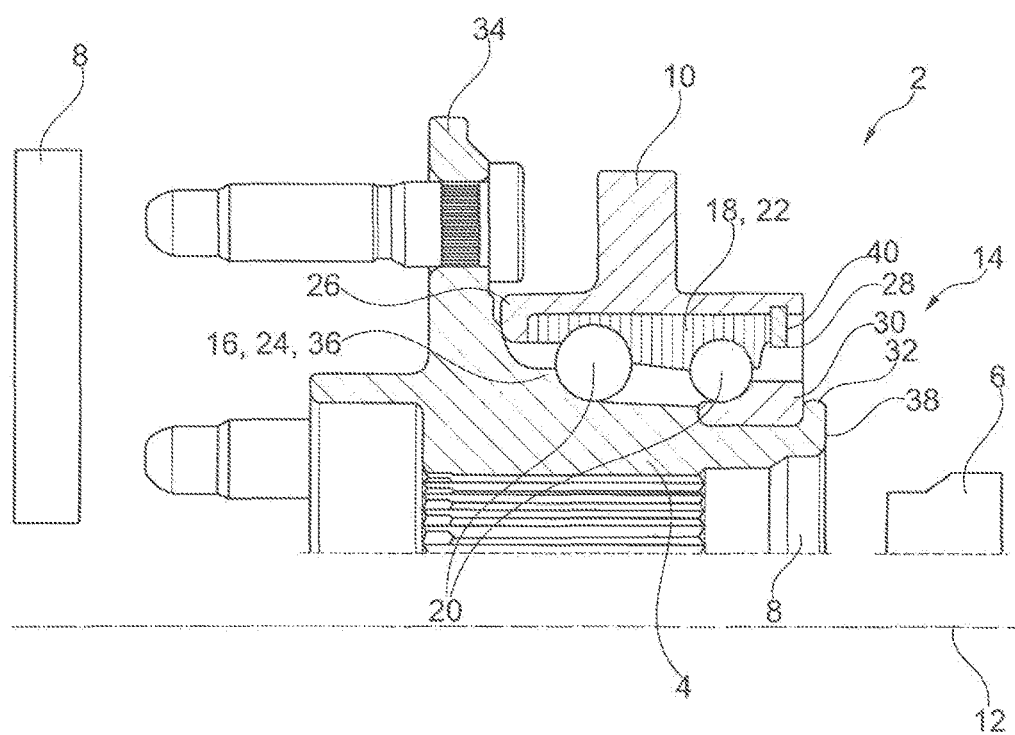
FIG. 1 is a sectioned lateral view of an extract of a first embodiment of an axle device.

FIG. 1 shows an axle device for a motor vehicle which as a whole is provided with the reference number 2. The same comprises a wheel receiving unit 4, on which a means of rotation 6 (schematically shown in FIG. 1), such as a shaft or an axle, and a wheel unit 8 (schematically shown in FIG. 1) can be fixed. In addition to this, the axle device 2 comprises a support body 10, on which the wheel receiving unit 4 is rotatably fixed about an axis of rotation 12.

In order to make possible rotating of the wheel receiving unit 4 relative to the support body 10 about the axis of rotation 12, a bearing unit 14 is arranged between the wheel receiving unit 4 and the support body 10. The bearing unit 14 comprises an inner bearing shell 16 and an outer bearing shell 18 as well as a plurality of rolling bodies 20, which are arranged between the inner bearing shell 16 and the outer bearing shell 18.

The outer bearing shell 18 is formed by a sleeve body 22, which is fixed on the support body 10. The inner bearing shell 16 is formed by a surface portion 24 of the wheel receiving unit 4 formed as outer bearing ring.

In order to limit movement of the sleeve body 22 in axial direction, the support body 10, on the side facing the wheel unit 8, comprises a stop element 26, which the sleeve body 22 abuts. In addition to this, the axle device 2 comprises a locking element 28 that can be fixed on the support body 10, which on the side of the bearing unit 14 facing the means of rotation 6 abuts the sleeve body 22, and in FIG. 1 is formed by a separate locking ring 40.

In addition to this, the axle device 2 in the exemplary embodiment shown in FIG. 1 comprises a closure element 30, which axially extends on the surface portion 24 of the wheel receiving unit 4 forming the inner bearing shell 16 of the bearing unit 14 on the side facing away from the wheel unit 8 and axially forms a back-engagement for a row of rolling bodies 20.

In order to limit axial movement of the closure element 30, the closure element 30 on the side facing the wheel unit 8 abuts the wheel receiving unit 4. On the side facing the means of rotation 6 the closure element 30 is axially engaged behind by a forming portion 32 of the wheel receiving unit 4. In the exemplary embodiment shown in FIG. 1, the wheel receiving unit 4 comprises a wheel receiving portion 34, on which the wheel unit 8 is fixed, a hub portion 36, on the surface portion 24 of which the outer bearing ring is formed, and a rotary head 38, on which the means of rotation 6 is fixed, as joint component.

In addition to this, the axle device 2 shown in FIG. 1 comprises a double-row bearing.

Figure 2:
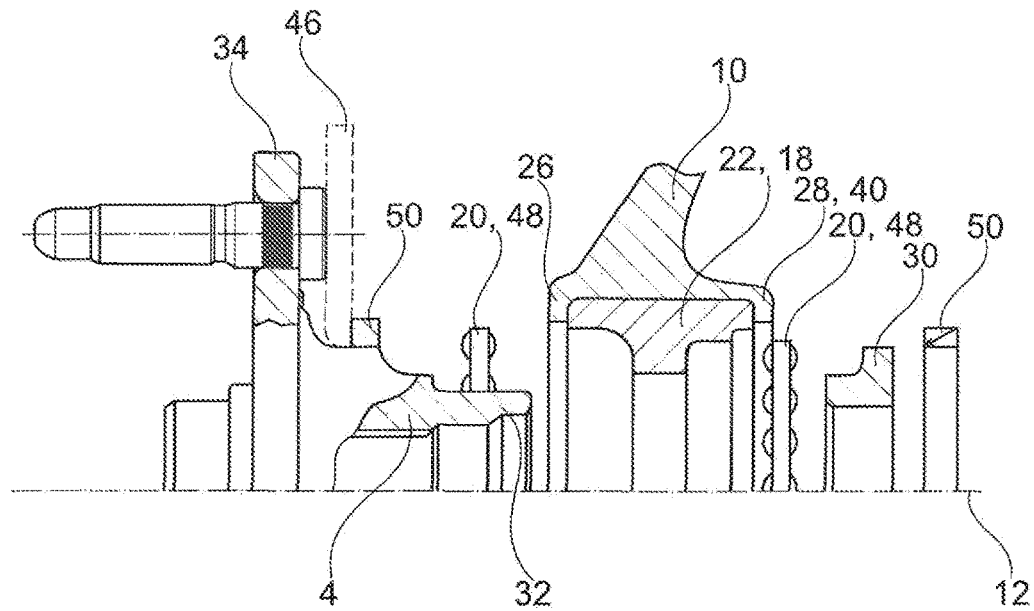
FIG. 2 is a sectioned exploded lateral view of an extract of a second embodiment of the axle device.

A method for producing the axle device 2 is described in the following with the help of FIG. 2:

In a first step, the sleeve body (22) forming an outer bearing shell (18) for a bearing unit (14) is fixed in the support body (10). Fixing can comprise fixing realized by casting-in or over-casting and/or forging in or over-forging. In the exemplary embodiment shown in FIG. 2, the support body 10 following the joining is fixed by the stop element 26 and by the locking element 28 formed as locking ring 40, both of which are realized by over-forging the support body 10.

In a further step, a first bearing position and/or a second bearing position of the inner bearing shell (16) formed by a surface portion (24) of a wheel receiving unit (4), the outer bearing shell (18) and/or the plurality of rolling bodies (20) is measured in particular axially and radially.

Following this, a first shaft sealing ring (50) is pressed onto the wheel receiving unit (4). During this and during further steps, the wheel receiving unit 4 is held by retaining claws 46.

As a further step, a plurality of rolling bodies (20) corresponding to the bearing shells measured in first position is encased in a first bearing cage (48) and arranged in the first bearing position of the wheel receiving unit (4).

Following this, the wheel receiving unit (4) is transferred into the sleeve body (22).

In a following step, a plurality of rolling bodies (20) measured in the second hearing position and corresponding to the measured bearing shells is encased in a second bearing cage (48) and arranged in the second hearing position of the wheel receiving unit (4).

In a further step, a second shaft sealing ring (50) is pressed onto the wheel receiving unit (4) and the sleeve body (22) fixed on the support body (10) and the closure element (30) on the wheel receiving unit (4).

Fixing the sleeve body 22 on the support body 10 is realized by the locking ring 28. Fixing the closure element 30 on the wheel receiving unit 4 is realized by the re-formed portion 32 of the wheel receiving unit 4. Here, the forming can comprise extruding.

Furthermore, shaft sealing rings 50 are arranged on both sides of the support body 10.

In the embodiment shown in FIG. 1 the wheel receiving unit 4 comprises a rotary head 38, on which the means of rotation 6 can be fixed.

Figure 3:
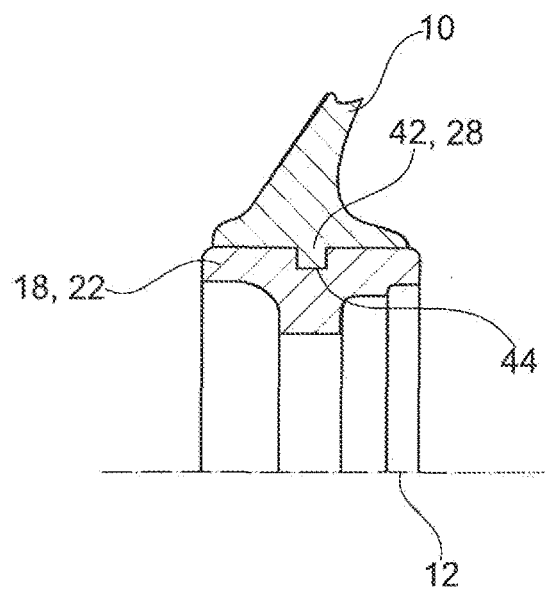
FIG. 3 is a sectioned lateral detail view of a further embodiment of a locking element.

FIG. 3 shows a detail view in which the locking element 28 is formed by a protrusion 42 of the support body 10. The protrusion 42 engages in a groove 44 formed in the sleeve body 22 and fixes the sleeve body against movement in axial direction.

The characterizing features of the invention shown in the above description, in the claims and in the drawings can be substantial both individually as well as in any combination in realizing the invention and its various embodiments. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An axle device for a motor vehicle comprising:
 an axle shaft;
 a wheel receiving unit fixed on an end of the axle shaft;
 a support body on which the wheel receiving unit is supported for rotation about an axis of rotation;
 a bearing unit arranged between the support body and the wheel receiving unit, the bearing unit having a plurality of bearings journally supported upon and directly engaging a surface portion of the wheel receiving unit absent an inner bearing shell and an outer bearing shell at least partially formed by a sleeve body abutting the support body; and
 a locking element fixed on the support body and cooperating with a stop element to fix the sleeve body against movement in an axial direction, the locking element having a locking ring which, on the side of the bearing unit facing the axle shaft, abuts the sleeve body such that a protrusion formed on the support body engages in a radially extended groove formed in the sleeve body.

2. The axle device according to claim 1, wherein the stop element engages the support body and the sleeve body and limits axial movement of the sleeve body relative to the support body.

3. The axle device according to claim 1, wherein the wheel receiving unit comprises a wheel receiving portion configured to secure a wheel unit to the axle device, a hub portion on which the surface portion is formed, and a rotary head receiving an end of the axle shaft.

4. The axle device according to claim 1, wherein the plurality of bearings comprises a plurality of bearings arranged in first and second rows with respect to the axis of rotation.

5. The axle device according to claim 4 wherein the plurality of bearings in the first row have a first diameter and the plurality of bearings in the second row have a second diameter which is different than the first diameter.

6. The axle device according to claim 4, wherein the plurality of bearings are selected from the group consisting of ball bearings, cylinder bearings, needle bearings, spherical roller bearings or cone bearings.

7. The axle device according to claim 1, wherein the support body is at least partially formed from aluminum and the sleeve body is formed from bearing steel.

8. The axle device according to claim 1, wherein the wheel receiving unit comprises a closure element that axially extends on the surface portion on a side adjacent the axle shaft and axially forms a back engagement for the plurality of bearings with a forming portion of the wheel receiving unit, which abuts the closure element on the side facing away from the surface portion.

9. A method for producing the axle device according to claim 4, the method comprising:
 fixing the sleeve body in the support body to form the outer bearing shell;
 measuring a first bearing position and a second bearing position of the surface portion;
 pressing a first shaft sealing ring onto the wheel receiving unit;
 encasing the bearings corresponding to the first row of bearings in a first bearing cage and arranging the first bearing cage equipped with the first row of bearings in the first bearing position of the wheel receiving unit;
 transferring the wheel receiving unit into the sleeve body;
 encasing the bearing corresponding to the second row of bearings in a second bearing cage and arranging the second bearing cage equipped with the second row of bearings in the second bearing position of the wheel receiving unit;
 pressing a second shaft sealing ring onto the wheel receiving unit; and
 fixing the sleeve body on the support body.

10. A motor vehicle comprising at least one axle device according to claim 1 and a wheel unit secured to the wheel receiving unit.

11. An axle device for a motor vehicle comprising:
 an axle shaft;
 a wheel receiving unit fixed on an end of the axle shaft;
 a support body on which the wheel receiving unit is supported for rotation about an axis of rotation; and
 a bearing unit arranged between the support body and the wheel receiving unit, the bearing unit having a plurality of bearings journally supported upon and directly engaging a surface portion of the wheel receiving unit absent an inner bearing shell and an outer bearing shell at least partially formed by a sleeve body abutting the support body; and, wherein
 the wheel receiving unit has a closure element that extends axially on the surface portion on a side adjacent the axle shaft and axially forms a back engagement for the plurality of bearings with a forming portion of the wheel receiving unit, which abuts the closure element on the side facing away from the surface portion.

12. The axle device according to claim 11, wherein the bearing unit further comprises a stop element engaging the support body and the sleeve body and limiting axial movement of the sleeve body relative to the support body.

13. The axle device according to claim 12, further comprising a locking element fixed on the support body and cooperating with the stop element to fix the sleeve body against movement in axial direction.

14. The axle device according to claim 13, wherein the locking element comprises a locking ring which, on a side of the bearing unit facing the axle shaft, abuts the sleeve body such that a protrusion formed on the support body engages in a radially extended groove formed in the sleeve body.

15. The axle device according to claim 11, wherein the wheel receiving unit comprises a wheel receiving portion configured to secure a wheel unit to the axle device, a hub portion on which the surface portion is formed, and a rotary head receiving an end of the axle shaft.

16. The axle device according to claim 11, wherein the plurality of bearings comprises a plurality of bearings arranged in first and second rows with respect to the axis of rotation.

17. The axle device according to claim 16, wherein the plurality of bearings in the first row have a first diameter and the plurality of bearings in the second row have a second diameter which is different than the first diameter.

18. The axle device according to claim 16, wherein the plurality of bearings are selected from the group consisting of ball bearings, cylinder bearings, needle bearings, spherical roller bearings or cone bearings.

19. The axle device according to claim 11, wherein the support body is at least partially formed from aluminum and the sleeve body is formed from bearing steel.

20. A motor vehicle comprising at least one axle device according to claim 11 and a wheel unit secured to the wheel receiving unit.

* * * * *